United States Patent
Wilburn et al.

(10) Patent No.: US 6,909,406 B2
(45) Date of Patent: Jun. 21, 2005

(54) SYSTEM AND METHOD FOR SELECTING A PRESENTATION MODE

(75) Inventors: Teresa A. Wilburn, Pflugerville, TX (US); Rachel D. Starnes, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 396 days.

(21) Appl. No.: 10/099,245

(22) Filed: Mar. 15, 2002

(65) Prior Publication Data

US 2003/0174161 A1 Sep. 18, 2003

(51) Int. Cl.$^7$ ................................................ G09G 5/00
(52) U.S. Cl. ...................... 345/3.1; 345/3.3; 345/3.4; 345/3.2
(58) Field of Search ........................... 345/1.1, 1.2, 2.2, 345/3.1, 3.2, 3.3, 3.4, 11, 30, 87, 156–158, 5, 10; 702/82

(56) References Cited

U.S. PATENT DOCUMENTS

| | | | |
|---|---|---|---|
| 6,275,214 B1 | 8/2001 | Hansen | 345/158 |
| 6,297,858 B1 | 10/2001 | Yang | 348/731 |
| 6,323,839 B1 * | 11/2001 | Fukuda et al. | 345/157 |
| 6,329,983 B1 | 12/2001 | Wang | 345/211 |
| 2003/0036866 A1 * | 2/2003 | Nair et al. | |

* cited by examiner

Primary Examiner—Vijay Shankar
(74) Attorney, Agent, or Firm—Hamilton & Terrile, LLP; Robert W. Holland

(57) ABSTRACT

A presentation module associated with the BIOS of an information handling system, such as a portable computer, allows an intermediate level driver, such as a dynamic link library, to set the presentation display type. In one embodiment, a graphical user interface on a portable computer LCD calls a presentation dynamic link library to coordinate selection and unselection of a projector for displaying information from the portable computer. Upon selection of the projector, the presentation module detects the resolution of the projector and a resolution application programming interface sets the projector resolution of the portable computer to the highest supported resolution.

20 Claims, 2 Drawing Sheets

SYSTEM AND METHOD FOR SELECTING A PRESENTATION MODE

BACKGROUND OF THE INVENTION

1. Field of the Invention

The present invention relates in general to the field of information handling systems, and more particularly relates to a method and system for selecting a presentation mode of an information handling system, such as selecting presentation of information from a portable computer through a projector.

2. Description of the Related Art

As the value and use of information continues to increase, individuals and businesses seek additional ways to process and store information. One option available to users is information handling systems. An information handling system generally process, compiles, stores and/or communicates information or data for business, personal or other purposes thereby allowing users to take advantage of the value of the information. Because technology and information handling needs and requirements vary between different users or applications, information handling systems may also vary regarding what information is handled, how the information is handled, how much information is processed, stored or communicated, and how quickly and efficiently the information may be processed, stored or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store and communicate information and may include one or more computer systems, data storage systems, and networking systems.

The use of a variety of hardware and software components with information handling systems sometimes leads to difficulty in configuring the systems to operate properly. For instance, one common difficulty is the configuring of computer systems to display information from different types of display devices, such as cathode ray tubes (CRT) and liquid crystal displays (LCD). To aid in the configuration of display devices, the WINDOWS operating system offers functionality in which the computer system BIOS detects devices during boot and cooperates with the operating system to configure the computer interfacing with the detected display devices. Although this functionality simplifies the process of interfacing a display device with a computer system, it is generally limited to use in system boot and is generally not able to dynamically detect added video devices and switch to them on the fly. Thus, a computer running WINDOWS in an operational state is generally not able to select a display device added after boot and is thus not able to configure display settings for the added device, such as resolution settings.

One difficult situation often faced by computer users is the interfacing of a projector with a portable computer, such as a laptop, to make a presentation. For instance, a portable computer stores presentation information, such as a presentation in POWERPOINT, and is interfaced with a projector for showing the presentation information on a screen. In order to select the projector to receive the presentation information, the portable computer typically must initiate a signal to a port interfaced with the projector and then must configure the presentation information for the projector, such as by setting the portable computer for a desired resolution associated with the projector. One manner for switching the display of presentation information to select the projector is to toggle through display modes by a keyboard interface with the BIOS of the portable computer. For instance, hitting the function and F8 keys simultaneously commands the BIOS to sequence the portable computer through three presentation modes: an LCD only presentation mode in which presentation of information is only through the LCD of the portable computer; a CRT only presentation mode in which display of information is only through a video port of the portable computer; and a simulscan presentation mode in which presentation of information is through both the LCD and the video port of the portable computer.

Although toggling through presentation modes with the keyboard function allows a portable computer user to select a presentation mode for presentation of information through a projector, this toggling function is inconvenient and difficult to use and often does not result in an optimal display of the presentation information over the projector. For instance, when a user sets up for a presentation the user is often under time pressure and in front of an audience. In some cases, the user lacks the time or opportunity to test the projector being used and sometimes must even connect the portable computer to the projector for the first time in front of the audience. Assuming the projector gets a signal from the portable computer and presents information, the user still must set the resolution of the projector to obtain an optimal presentation. For a user under pressure and in front of an audience, the first impression often sets the tone of the presentation, and fumbling with a projector and portable computer is hardly the first impression that the user desires for any audience.

SUMMARY OF THE INVENTION

Therefore a need has arisen for a system and method which simplifies the selection of the presentation mode of an information handling system.

A further need has arisen for a system and method which provides a user interface for selecting a projector presentation mode.

A further need has arisen for a system and method which selects presentation of information through an unconfigured display mode having an unconfigured resolution.

In accordance with the present invention, a system and method are provided that substantially reduce or eliminate disadvantages and problems associated with previous systems and methods for selecting a presentation mode for an information handling system. An unconfigured display device is selected with a graphical user interface presented by a configured display of the information handling system. The selection is communicated to the BIOS of the information handling system by a presentation tool running on the information handling system so that a presentation module of the BIOS commands a switch to the unconfigured display device.

More specifically, in one embodiment, the graphical user interface presents a presentation button that switches between the LCD only presentation mode of a portable computer and the simulscan presentation mode with a single click of a mouse I/O device. A presentation tool operable on the portable computer's CPU, such as a presentation dynamic link library (DLL), is called upon selection of the presentation button to coordinate selection of the desired presentation mode. The presentation DLL communicates the requested presentation mode switch with a presentation module of the portable computer's BIOS. The presentation module applies BIOS and/or video BIOS functionality to determine the current and selected presentation modes and to command a switch to the requested presentation mode if appropriate. For instance, if an unconfigured presentation device interfaces with the portable computer and the portable computer is in an LCD only presentation mode, then the presentation module commands a switch to the simulscan presentation mode to enable presentation from the unconfigured presentation device. If the portable computer is already in the simulscan presentation mode, then the presentation module commands selection of LCD only or another predetermined mode, such as the presentation mode in use at the time of the selection of the simulscan presentation mode.

One specific example of the present invention is the interfacing of a projector with a portable computer video port to present information over a screen, such as before an audience. A user having presentation information on the portable computer views the presentation information over a configured device, such as an LCD recognized by the portable computer during boot. The configured device, for instance, has resolution settings configured by the operating system and video driver of the portable computer to ensure an accurate display of the presentation information. The user then interfaces the projector with the portable computer to project the presentation information for the audience. The portable computer initially lacks resolution settings for the projector and does not recognize the projector, for instance, because the projector is interfaced after boot. The user selects a presentation button from a graphical user interface presented by the configured display, such as the portable computer's LCD, to call a presentation dynamic link library. The presentation dynamic link library initiates the presentation module of the portable computer's BIOS to determine the current display mode and to determine that the projector is interfaced with the portable computer. The presentation module commands a switch to the simulscan presentation mode, enabling display of the presentation information over both the projector and the LCD and also detects the resolution of the projector. A resolution module, such as an application programming interface (API) associated with the operating system of the portable computer system, receives the detected resolution of the projector and configures the projector on the portable computer system with an appropriate resolution. Upon completion of the presentation, selection of the presentation button commands the presentation module through the presentation dynamic link library to return to the saved display mode and the resolution.

The present invention provides a number of important technical advantages. One example of an important technical advantage is the simplification of the selection of presentation modes for an information handling system. For instance, a display device added on the fly is automatically recognized and configured by selection of a single graphical user interface button. Similarly, the same button returns the information handling system to the originally configured presentation mode. The use of a single graphical user interface button greatly simplifies presentation mode selection so that a user under time constraints or other pressures may reliably and quickly set the information handling system to a desired presentation mode without undue thought or stress.

Another example of an important technical advantage is that a user interface selects a projector presentation mode to automatically recognize, select and configure the resolution of a projector interfaced with a portable computer both quickly and reliably. The presentation module of the BIOS enables operating system interaction with BIOS functionality for establishing and configuring the physical projector device, including interaction with resolution tools that set an optimal resolution for the device determined by the BIOS functionality. The graphical user interface advantageously provides a familiar and user-friendly environment for quick selection of the projector presentation mode under difficult or stressful situations.

Another example of an important technical advantage of the present invention is that selection of presentation of information through an unconfigured display mode is provided through a configured display mode. For instance, a LCD of a portable computer displays a graphical user interface that initiates recognition of an unconfigured display device, such as a projector interfaced after boot, by the operating system. Once recognized by the operating system, resolution tools associated with the operating system, such as resolution application programming interfaces, set the resolution of the unconfigured device to obtain a desired presentation resolution.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Preferred embodiments of the present invention are illustrated in the figures, like numerals being used referred to like and corresponding parts of the various drawings.

The present invention provides greater convenience and ease of use for information handling systems by improving flexibility for adding display devices to information handling systems on the fly. A module added to the BIOS of the information handling system allows intermediate level drivers operating on the CPU of the information handling system, such as a dynamic link library, to set the display type and configuration. For instance, an unconfigured display device added after boot of the information handling system is recognized upon a user command to allow configuration of the display device, such as determination and setting of resolution, for use with the information handling system.

Figure 1:
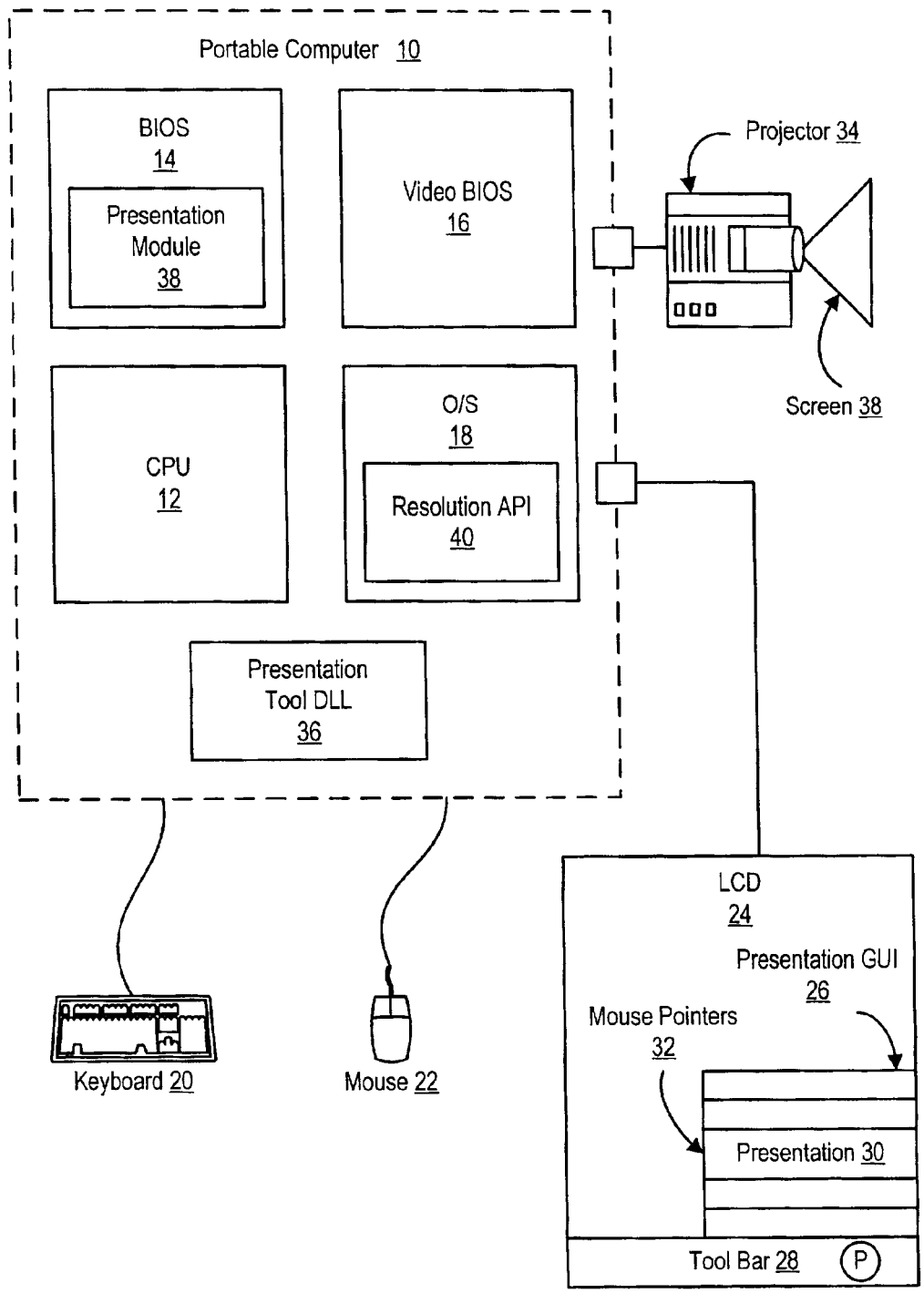
FIG. 1 depicts a block diagram of a portable computer interfaced with a projector for displaying presentation information.
Figure 2:
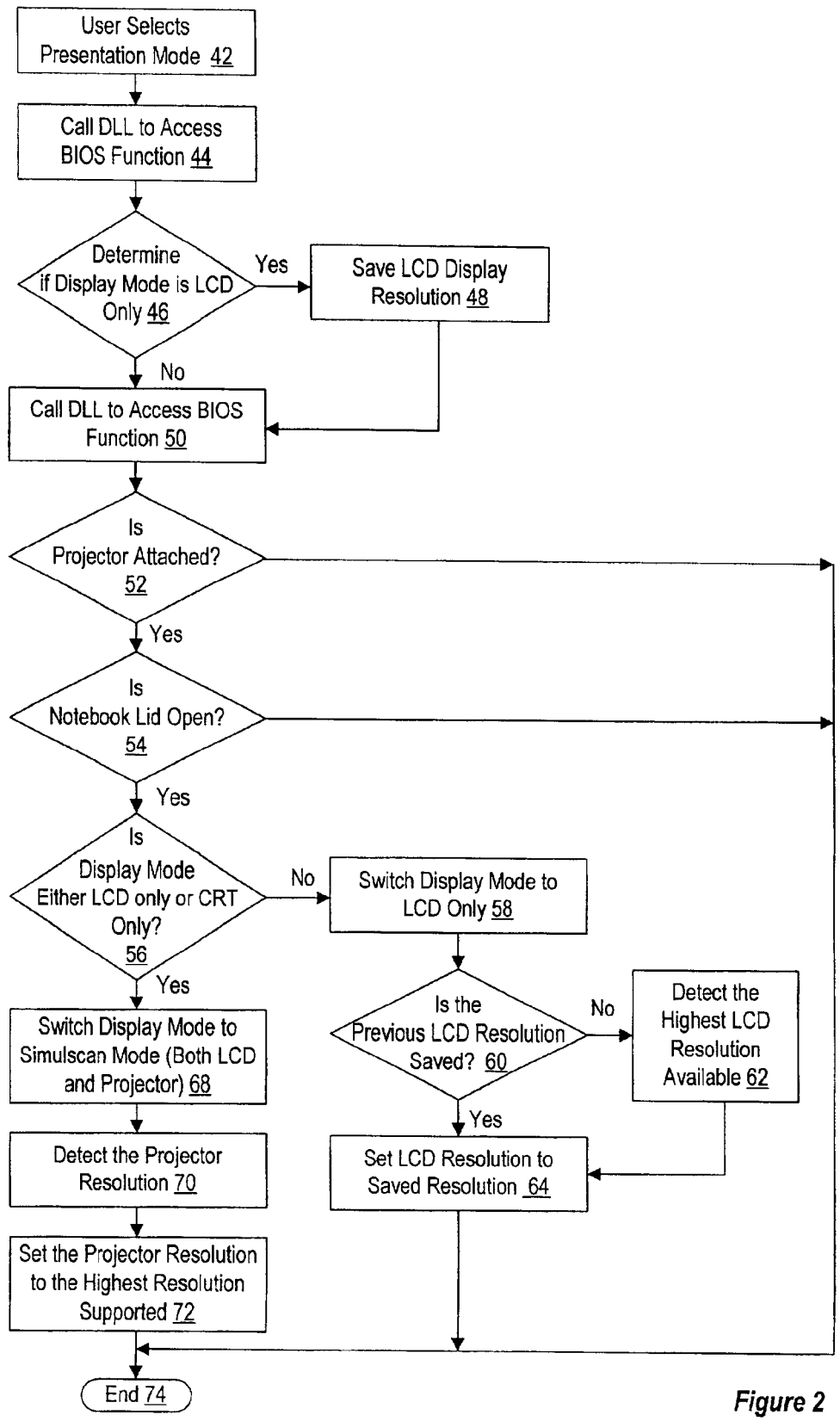
FIG. 2 depicts a flow diagram of steps for recognizing, selecting and setting the resolution of a projector for displaying presentation information.

Referring now to FIG. 1, a block diagram depicts a portable computer 10 having a CPU 12, BIOS 14 and video BIOS 16. BIOS 14 coordinates communication between physical and peripheral devices of portable computer 10 and CPU 12 to allow an operating system 18 running on CPU 12 to operate the physical devices. Video BIOS 16 coordinates communication with display devices in cooperation with BIOS 14 and may have its functionality included within BIOS 14. Although FIG. 2 depicts a portable computer 10, for purposes of this disclosure, any information handling system may apply. An information handling system may include any instrumentality or aggregate of instrumentalities operable to compute, classify, process, transmit, receive, retrieve, originate, switch, store, display, manifest, detect, record, reproduce, handle or utilize any form of information, intelligence, or data for business, scientific, control or other purposes. For example, an information handling system may be a personal computer, a network storage device, or any other suitable device and may vary in size, shape, performance, functionality and price. The information handling system may include random access memory (RAM), one or more processing resources such as a CPU, or hardware or software control logic, ROM and/or other types of nonvolatile memory. Additional components of the information handling system may include one or more disk drives, one or more network ports for communicating with external devices as well as various input and output (I/O) devices, such as a keyboard 20, a mouse 22 and a video display such as LCD 24. The information handling system may include one or more buses operable to transmit communications between the various hardware components.

LCD 24 displays a presentation graphical user interface 26 which is, for instance, called from a tool bar 28. Presentation graphical user interface 26 includes a presentation button 30, such as a navigation bar with the label "presentation," that is activated by a pointer 32 controlled by mouse 22 or otherwise activated through keyboard 20 or other I/O devices capable of interacting with presentation graphical user interface 26. Thus, for instance, a user desiring to present information from the portable computer 10 through a projector 34 simply points and clicks presentation button 30 of presentation graphical user interface 26. Similarly, a user displaying information over a projector 34 and desiring to return to the presentation mode in use before selection of the projector simply points and clicks presentation button 30 of presentation graphical user interface 26.

Upon selection of presentation button 30, a presentation tool 36, such as a presentation dynamic link library, is run on CPU 12 to access functionality of BIOS 14. For instance, a presentation dynamic link library 36 calls a presentation module 38, such as a module operating within BIOS 14 as a firmware or software module. Presentation module 38 determines the current display mode of portable computer 10 and, if the current display mode does not display information over the projector 34, presentation module 38 gets the current presentation mode resolution settings and then presentation DLL saves the settings. If presentation module 38 detects projector 34 and determines that the current display mode is LCD only, then presentation module 38 commands selection of the simulscan presentation mode to enable presentation of information through projector 34. If presentation module 38 determines that projector 34 is in use, for instance because portable computer 10 is in the simulscan presentation mode, then presentation module 38 commands selection of the previous presentation mode from memory. Presentation module 38 commands the selection of presentation modes by accessing and using functionality of BIOS 14 and video BIOS 16 as appropriate.

Presentation module 38 communicates the change in presentation mode to presentation dynamic link library 36. If projector 34 is unconfigured for portable computer 10, presentation dynamic link library 36 calls operating system tools to configure projector 34 and thus obtain an optimal presentation of information on screen 38. For instance, resolution application programming interfaces are called to set the resolution of projector 34 in cooperation with BIOS 14 and video BIOS 16 based on a determination of the resolution by presentation module 38. As a specific example available with WINDOWS operating systems 18, presentation dynamic link library 36 may call the "enumdisplaytype" and "changedisplaytype" APIs to set the resolution of projector 34. In this manner, the user of portable computer 10 is able to switch to a presentation mode for displaying information over projector 34 as a configured device by selecting a single navigation bar of presentation graphical user interface 26 available in a user-friendly and familiar environment on the configured LCD display.

Referring now to FIG. 2, a flow diagram depicts the logical steps for switching between presentation modes of a portable computer 10. The process starts as step 42 with the selection of presentation button 30 by a user through presentation graphical user interface 26 displayed on LCD 24. At step 44, presentation dynamic link library 36 is called to access BIOS and video BIOS functions through presentation module 38 for interacting with the current configured display devices to command a determination of the current display mode. At step 46, a determination is made of whether the current display mode is LCD only. If yes, then at step 48 LCD display resolution is saved as a LCD resolution variable and the process proceeds to step 50. The saved resolution variable helps ensure a seamless return to LCD only mode if presentation button 30 is re-selected by the user. If at step 46 the determination is no, then the process proceeds directly to step 50 at which the presentation dynamic link library 36 is again called.

At step 50, presentation dynamic link library 36 communicates with presentation module 38 to command a switch of display modes if appropriate. At step 52, presentation module 38 accesses functionality of BIOS 14 or video BIOS 16 to determine if a projector is attached to portable computer 10's projector port. If no, the process ends at step 74 since a change in presentation modes is not possible and an appropriate message is provided to the user to check the projector connection. If yes, the process proceeds to step 54 to determine if the portable computer lid is open. If no, the process ends at step 74 since a closed lid indicates that the video port is in use, such as with a CRT display device. In alternative embodiments with multiple video ports, the check of lid position may be skipped or otherwise modified. If the lid is open, the process proceeds to step 56. In alternative embodiments, the detection of and switching to an unconfigured CRT display may be desirable and the process may be adjusted to select presentation through the CRT either in the CRT only or simulscan display modes as desired.

At step 56, a determination is made of the current display mode in order to find whether a selection was made to use a projector or discontinue use of a projector. If the presentation mode is not LCD only or CRT only, the process proceeds to step 58 for commands to discontinue the use of the projector. At step 58, presentation module 38 commands a switch to LCD only mode and signals presentation dynamic link library 36. At step 60, presentation dynamic link library 36 determines whether the previous LCD resolution settings were saved, such as at step 48. If no, then at step 62, presentation module 38 detects the highest LCD resolution available in cooperation with BIOS 14, saves that resolution as the resolution variable, and proceeds to step 64. At step 64, resolution application programming interface 40 sets the LCD resolution to the saved LCD resolution variable, which is either the variable saved at step 48 or the variable detected at step 62 depending on the result of the determination made at step 60.

If the determination at step 56 is yes that the display mode is either LCD only or CRT only, the presentation module 38 commands selection of presentation through projector 34. At step 68, presentation module 38 commands a switch by BIOS 14 from the current presentation mode to the simulscan presentation mode to enable presentation of information over both LCD 24 and projector 34. Presentation module 38 signals the change to the simulscan presentation mode to presentation dynamic link library 36. At step 70, presentation module 38 detects the resolution of projector 34 and provides the resolution to dynamic link library 36. At step 72, resolution application programming interface 40 configures portable computer 10 for projector 34 by setting the projector resolution to the highest resolution supported. In this manner, the user is provided with the clearest possible presentation of information over a previously unconfigured display device in an automated fashion based on a single selection from a presentation graphical user interface presented over a configured LCD. In alternative embodiments, the detection and setting of resolution may be provided through alternative configurations of BIOS and operating system functionality.

In other embodiments of the present invention, variations of the above steps provide even greater ease of use. For instance, the detection of a projector interface may be accomplished with active detect that periodically scans the projector port. As an example, when a presentation program enters a view designed for display of information over a projector, the presentation program may call presentation dynamic link library 36 into an active mode that commands presentation module 38 to scan the projector port for a projector interface. Upon detection of a projector interface, presentation module 38 signals presentation dynamic link 36 which may automatically proceed with selection of the simulscan presentation mode and resolution settings or which may pop up a graphical user interface informing the user that automated selection of the projector is available by, for instance, responding positively to the pop up window or selecting a key or key combination from key board 20. In addition, presentation dynamic link library 36 and presentation module 38 may configure other types of display devices added on the fly to information handling systems.

Although the present invention has been described in detail, it should be understood that various changes, substitutions and alterations can be made hereto without departing from the spirit and scope of the invention as defined by the appended claims.

What is claimed is:

1. A system for selecting the mode of presentation for information from an information handling system, the information handling system having a CPU, a BIOS, an I/O device and a display, the system comprising:

a graphical user interface presented on the display, the graphical user interface having a presentation button operable for selection by the I/O device;

a presentation dynamic link library in communication with the presentation button and called for operation on the CPU upon selection of the presentation button;

a presentation module residing on the BIOS and accessable by the presentation dynamic link library, the presentation module operable to command detection of one or more presentation devices interfaced with the information handling system and selection of one or more of the presentation devices for presentation of the information; and an application programming interface communicating with the selected presentation device to configure the resolution for the selected presentation device.

2. The system of claim 1 wherein the computer comprises a portable computer.

3. The system of claim 2 wherein the display comprises an LCD display integrated with the portable computer.

4. The system of claim 3 wherein the selected presentation device comprises a projector.

5. The system of claim 4 wherein the presentation module commands selection of one of an LCD presentation mode, a CRT presentation mode or a simulscan presentation mode.

6. The system of claim 5 wherein the simulscan presentation mode comprises presentation of information through the LCD and the projector.

7. The system of claim 1 wherein the presentation module is operable to command detection of presentation of information in an LCD mode and selection of a simulscan mode having presentation of information through an LCD and a projector.

8. The system of claim 1 wherein the presentation module is operable to command detection of presentation of information in a simulscan mode having presentation of information through an LCD and a projector and to command selection of a LCD mode.

9. A method for selecting a presentation of information from a portable computer through a display associated with the portable computer and a projector, the method comprising:

initiating a presentation dynamic link library through a user interface of the display;

accessing with the presentation dynamic link library a presentation module of the BIOS of the portable computer;

commanding with the presentation module the selection of presentation of information with the projector; and calling an application programming interface to set the resolution of the projector.

10. The method of claim 9 wherein commanding with the presentation module further comprises:

determining if the display mode of the portable computer is LCD only, CRT only or simulscan;

if the display mode is either LCD only or CRT only, commanding with the presentation module the selection of simulscan mode to enable presentation with the projector;

if the display mode is simulscan, commanding with the presentation module the selection of either the LCD only mode or the CRT only mode.

11. The method of claim 10 wherein determining if the display mode further comprises:

if the display mode is either LCD only or CRT only, saving the resolution of the LCD or CRT display.

12. The method of claim 11 wherein commanding with the presentation module the selection of either the LCD only mode or the CRT only mode further comprises:

applying the saved resolution to set the resolution of the LCD or CRT.

13. A method for changing the display mode of an information system from a configured display mode to an unconfigured display mode, the method comprising:

selecting the unconfigured display mode with a graphical user interface presented by the configured display;

communicating the selecting of the unconfigured display to a presentation module of the information system BIOS; and switching to the unconfigured display mode by a command from the presentation module.

14. The method of claim 13 wherein the configured display comprises an LCD.

15. The method of claim 14 wherein the unconfigured display comprises a projector.

16. The method of claim 14 wherein the unconfigured display comprises a CRT display.

17. The method of claim 15 wherein switching to the unconfigured display mode further comprises selecting a simulscan presentation mode.

18. The method of claim 13 wherein communicating the selecting of the unconfigured display further comprises communicating with the presentation module through a dynamic link library.

19. The method of claim 13 further comprising configuring the unconfigured device for presenting information from the information handling system.

20. The method of claim 19 wherein configuring the unconfigured device further comprises determining the resolution of the unconfigured device and setting the information handling system to display information from line unconfigured device at the highest supported resolution.

* * * * *